United States Patent
Linna et al.

(10) Patent No.: US 6,913,005 B2
(45) Date of Patent: Jul. 5, 2005

(54) SYSTEM AND METHODOLOGY FOR PURGING FUEL FROM A FUEL INJECTOR DURING START-UP

(75) Inventors: Jan-Roger Linna, Boston, MA (US); John Paul Mello, Belmont, MA (US); Chad Smutzer, Waltham, MA (US)

(73) Assignee: Chrysalis Technologies Incorporated, Richmond, VA (US)

( * ) Notice: Subject to any disclaimer, the term of this patent is extended or adjusted under 35 U.S.C. 154(b) by 25 days.

(21) Appl. No.: 10/410,976

(22) Filed: Apr. 10, 2003

(65) Prior Publication Data

US 2004/0000296 A1 Jan. 1, 2004

Related U.S. Application Data

(63) Continuation-in-part of application No. 10/284,180, filed on Oct. 31, 2002, which is a continuation-in-part of application No. 10/143,250, filed on May 10, 2002, now Pat. No. 6,779,513.
(60) Provisional application No. 60/367,121, filed on Mar. 22, 2002.

(51) Int. Cl.⁷ .............................................. F02M 31/00
(52) U.S. Cl. ....................................... 123/549; 123/557
(58) Field of Search ................................ 123/549, 557; 239/5, 86

(56) References Cited

U.S. PATENT DOCUMENTS

| | | | |
|---|---|---|---|
| 3,716,416 A | 2/1973 | Adlhart et al. | |
| 3,868,939 A | 3/1975 | Friese et al. | |
| 3,999,525 A | 12/1976 | Stumpp et al. | |
| 4,210,103 A | 7/1980 | Dimitroff et al. | |
| 4,223,652 A | 9/1980 | Budnicki | |

(Continued)

FOREIGN PATENT DOCUMENTS

| | | |
|---|---|---|
| DE | 482591 | 2/1930 |
| DE | 19546851 | 6/1997 |
| EP | 0915248 | 5/1999 |
| JP | 5-141329 | 6/1993 |
| WO | WO 87/00887 | 2/1987 |

OTHER PUBLICATIONS

Boyle et al., "Cold Start Performance of an Automobile Engine Using Prevaporized Gasoline" SAE Technical Paper Series, Society of Automotive Engineers. vol. 102, No. 3, pp 949–957 (1993).
English abstract of JP 2000 110666.
English abstract of DE 19546851.
English abstract of EP 0,915,248.
Co-pending application (U.S. Appl. No. 10/143,250).
Co-pending application (U.S. Appl. No. 10/284,180).

*Primary Examiner*—Marguerite McMahon
(74) *Attorney, Agent, or Firm*—Roberts, Mlotkowski & Hobbes

(57) ABSTRACT

A fuel system for use in an internal combustion engine includes a plurality of fuel injectors, each injector including at least one capillary flow passage, the at least one capillary flow passage having an inlet end and an outlet end, a heat source arranged along the at least one capillary flow passage, the heat source operable to heat a liquid fuel in the at least one capillary flow passage to a level sufficient to convert at least a portion thereof from the liquid state to a vapor state, and a valve for metering fuel to the internal combustion engine, a controller to control the power supplied to the heat source of each of the plurality of fuel injectors to achieve a predetermined target temperature, a sensor for use in determining engine air flow and a sensor for measuring a value indicative of degree of engine warm-up of the internal combustion engine. According to a further aspect of the present invention, an initial liquid fuel pulse is purged from the fuel injector while the intake valve is in a substantially closed position so as to further minimize hydrocarbon emissions at startup.

16 Claims, 10 Drawing Sheets

U.S. PATENT DOCUMENTS

| | | | |
|---|---|---|---|
| 4,344,402 A | 8/1982 | Child et al. | |
| 4,345,569 A | 8/1982 | Hattori et al. | |
| 4,359,025 A | * 11/1982 | Zeliszkewycz | 123/250 |
| 4,403,576 A | 9/1983 | Dimitroff et al. | |
| 4,458,655 A | 7/1984 | Oza | |
| 4,870,932 A | 10/1989 | Asmus | |
| 4,886,032 A | 12/1989 | Asmus | |
| 4,955,351 A | 9/1990 | Lewis et al. | |
| 5,195,477 A | 3/1993 | Hudson, Jr. et al. | |
| 5,226,400 A | 7/1993 | Birch | |
| 5,331,937 A | 7/1994 | Clarke | |
| 5,332,046 A | 7/1994 | Tanimizu et al. | |
| 5,343,848 A | 9/1994 | Birch et al. | |
| 5,482,023 A | 1/1996 | Hunt et al. | |
| 5,524,582 A | 6/1996 | Suh et al. | |
| 5,529,035 A | 6/1996 | Hunt et al. | |
| 5,758,826 A | 6/1998 | Nines | |
| 5,813,388 A | 9/1998 | Cikanek, Jr. et al. | |
| 5,836,289 A | 11/1998 | Thring | |
| 5,894,832 A | 4/1999 | Nogi et al. | |
| 5,947,091 A | 9/1999 | Krohn et al. | |
| 6,067,970 A | 5/2000 | Awarzamani et al. | |
| 6,067,971 A | 5/2000 | Cikanek, Jr. et al. | |
| 6,102,303 A | 8/2000 | Bright et al. | |
| 6,109,247 A | 8/2000 | Hunt | |
| 6,189,518 B1 | 2/2001 | Cooke | |
| 6,189,803 B1 | 2/2001 | Ganan-Calvo | |
| 6,234,153 B1 | 5/2001 | DeGroot et al. | |
| 6,237,576 B1 | 5/2001 | Buccino et al. | |
| 6,276,347 B1 | 8/2001 | Hunt | |
| 6,315,217 B1 | * 11/2001 | Park | 239/135 |
| 6,332,457 B1 | 12/2001 | Imoehl | |
| 6,354,256 B1 | 3/2002 | Ohanian et al. | |
| 6,390,076 B2 | 5/2002 | Hunt | |
| 6,543,412 B2 | * 4/2003 | Amou et al. | 123/337 |
| 2001/0020469 A1 | 9/2001 | Hunt | |

* cited by examiner

SYSTEM AND METHODOLOGY FOR PURGING FUEL FROM A FUEL INJECTOR DURING START-UP

RELATED APPLICATION

This patent application is a continuation-in-part of application Ser. No. 10/284,180, filed on Oct. 31, 2002, directed to a FUEL SYSTEM FOR AN INTERNAL COMBUSTION ENGINE AND METHOD FOR CONTROLLING SAME, which is a continuation-in-part of application Ser. No. 10/143,250, filed on May 10, 2002 now U.S. Pat. No. 6,779,513 which claims benefit of Provisional Application No. 60/367,121, filed Mar. 22, 2002, directed to a FUEL INJECTOR FOR AN INTERNAL COMBUSTION ENGINE, which are hereby incorporated by reference.

FIELD

The present invention relates to fuel delivery in an internal combustion engine.

BACKGROUND

In light of the evermore stringent emissions regulations that are planned to take effect over the next few years, including California Low Emission Vehicle II (LEV II), Federal USA EPA Tier 2 and European Union EU-IV, pre-catalyst engine-out HC emissions, especially during cold start and warm-up, are attracting significant efforts in research and development. This is due in large part to the fact that as much as 80 percent of the total hydrocarbon emissions produced by a typical, modern light-duty vehicle during the Federal Test Procedure (FTP) can occur during the first 120 seconds of the test.

These high levels of emissions are largely attributable to cold engine and exhaust component temperatures. Specifically, cold engine components necessitate fuel-rich operation, in which the excess fuel is used to compensate for the portion of fuel that has attached to the walls of the intake system and combustion chamber and, thus, is not readily combusted. In addition, a cold three-way catalyst cannot reduce a significant amount of the unburned hydrocarbons that pass through the engine during cold-start. As a result, high concentrations of unburned hydrocarbons are emitted from the tailpipe. It is understood that the over-fueling associated with excessive hydrocarbon emissions during cold-start could be eliminated through the use of gasoline vapor rather than liquid gasoline.

A variety of systems have been devised to supply fine liquid fuel droplets and air to internal combustion engines that work relatively well after engine warm-up. These systems either supply fuel directly into the combustion chamber (direct injection) or utilize a carburetor or fuel injector(s) to supply the mixture through an intake manifold into a combustion chamber (indirect injection). In currently employed systems, the fuel-air mixture is produced by atomizing a liquid fuel and supplying it as fine droplets into an air stream.

In conventional spark-ignited engines employing port-fuel injection, the injected fuel is vaporized by directing the liquid fuel droplets at hot components in the intake port or manifold. Under normal operating conditions, the liquid fuel films on the surfaces of the hot components and is subsequently vaporized. The mixture of vaporized fuel and intake air is then drawn into the cylinder by the pressure differential created as the intake valve opens and the piston moves towards bottom dead center. To ensure a degree of control that is compatible with modern engines, this vaporizing technique is typically optimized to occur in less than one engine cycle.

Under most engine operating conditions, the temperature of the intake components is sufficient to rapidly vaporize the impinging liquid fuel droplets. However, as indicated, under conditions such as cold-start and warm-up, the fuel is not vaporized through impingement on the relatively cold engine components. Instead, engine operation under these conditions is ensured by supplying excess fuel such that a sufficient fraction evaporates through heat and mass transfer as it travels through the air prior to impinging on a cold intake component. Evaporation rate through this mechanism is a function of fuel properties, temperature, pressure, relative droplet and air velocities and droplet diameter. Of course, this approach breaks down in extreme ambient cold-starts, in which the fuel volatility is insufficient to produce vapor in ignitable concentrations with air.

In order for combustion to be chemically complete, the fuel-air mixture must be vaporized to a stoichiometric or fuel-lean gas-phase mixture. A stoichiometric combustible mixture contains the exact quantities of air (oxygen) and fuel required for complete combustion. For gasoline, this air-fuel ratio is about 14.7:1 by weight. A fuel-air mixture that is not completely vaporized, nor stoichiometric, results in incomplete combustion and reduced thermal efficiency. The products of an ideal combustion process are water ($H_2O$) and carbon dioxide ($CO_2$). If combustion is incomplete, some carbon is not fully oxidized, yielding carbon monoxide (CO) and unburned hydrocarbons (HC).

The mandate to reduce air pollution has resulted in attempts to compensate for combustion inefficiencies with a multiplicity of fuel system and engine modifications. As evidenced by the prior art relating to fuel preparation and delivery systems, much effort has been directed to reducing liquid fuel droplet size, increasing system turbulence and providing sufficient heat to vaporize fuels to permit more complete combustion.

However, inefficient fuel preparation at lower engine temperatures remains a problem that results in higher emissions, requiring after-treatment and complex control strategies. Such control strategies can include exhaust gas recirculation, variable valve timing, retarded ignition timing, reduced compression ratios, the use of hydrocarbon traps and close-coupled catalytic converters and air injection to oxidize unburned hydrocarbons and produce an exothermic reaction benefiting catalytic converter light-off.

Given the relatively large proportion of unburned hydrocarbons emitted during startup, this aspect of light duty vehicle engine operation has been the focus of significant technology development efforts. Furthermore, as increasingly stringent emissions standards are enacted into legislation and consumers remain sensitive to pricing and performance, these development efforts will continue to be paramount.

One particular solution to the aforementioned difficulties involves the use of capillary channels to vaporize fuel. The use of capillary channels offers a number of distinct advantages over other techniques that are directed at supplying vaporized fuel to internal combustion engines. In particular, the high surface area to volume ratio of the capillary channel combined with the relatively low thermal mass of the capillary structure results in fast warm up times (on the order of less than 0.5 seconds) and minimal power requirements (on the order of 150 watts per cylinder) necessary to achieve the desired heating profile. Yet another advantage of capillary channels in connection with fuel vaporization is the fact that the capillary design can be integrated with the functionality of a conventional fuel injector such that a single injector can supply both liquid and vaporized fuel, depending upon the selected emission control strategy.

One form of a capillary channel-based fuel vaporizer is disclosed in U.S. patent application Ser. No. 10/284,180 such patent application being the patent application upon which this patent application is based. In that application, a fuel system for use in an internal combustion engine is disclosed and a preferred form includes a plurality of fuel injectors, each injector including (i) at least one capillary flow passage, the at least one capillary flow passage having an inlet end and an outlet end, (ii) a heat source arranged along the at least one capillary flow passage, the heat source operable to heat a liquid fuel in the at least one capillary flow passage to a level sufficient to convert at least a portion thereof from the liquid state to a vapor state, and (iii) a valve for metering fuel to the internal combustion engine, the valve located proximate to the outlet end of the at least one capillary flow passage, a liquid fuel supply system in fluid communication with the plurality of fuel injectors, a controller to control the power supplied to the heat source of each of the plurality of fuel injectors to achieve a predetermined target temperature, the predetermined target temperature operable to convert the portion of liquid fuel to the vapor state; means for determining engine air flow of the internal combustion engine, and a sensor for measuring a value indicative of degree of engine warm-up of the internal combustion engine, the sensor operatively connected to the controller; and wherein the portion of liquid fuel to be converted to the vapor state is controlled with reference to sensed internal combustion engine conditions to achieve minimal exhaust emissions.

The fuel system disclosed in the patent application upon which this patent application is based is effective in reducing cold-start and warm-up emissions of an internal combustion engine. Efficient combustion is promoted by forming an aerosol of fine droplet size when the substantially vaporized fuel condenses in air. The vaporized fuel can be supplied to a combustion chamber of an internal combustion engine during cold-start and warm-up of the engine and reduced emissions can be achieved.

The patent application upon which this patent is based also discloses a method for controlling the fuel system and delivering fuel to an internal combustion engine for a fuel system including at least one fuel injector having at least one capillary flow passage, a heat source arranged along the at least one capillary flow passage, the heat source capable of heating a liquid fuel in the at least one capillary flow passage to a level sufficient to convert at least a portion thereof from the liquid state to a vapor state, and a valve for metering fuel to the internal combustion engine, the valve located proximate to an outlet end of the at least one capillary flow passage. The method includes the steps of determining engine air flow of the internal combustion engine, measuring a value indicative of degree of engine warm-up of the internal combustion engine, determining a portion of liquid fuel to be converted to the vapor state by the at least one capillary flow passage, the determining step employing the measured values, controlling power supplied to the heat source of the at least one fuel injector to achieve a predetermined target temperature, the predetermined target temperature operable to convert the portion of liquid fuel to the vapor state so determined and delivering the fuel to a combustion chamber of the internal combustion engine and wherein the portion of liquid fuel to be converted to the vapor state is determined to achieve minimal exhaust emissions.

According to one preferred form described in that patent application, the capillary flow passage can include a capillary tube and the heat source can include a resistance heating element or a section of the tube heated by passing electrical current therethrough. The fuel supply can be arranged to deliver pressurized or non-pressurized liquid fuel to the flow passage. The apparatus can provide a stream of vaporized fuel that mixes with air and forms an aerosol having a mean droplet size of 25 µm or less.

Even with the use of capillary channels to vaporize fuel, there still exists an inherent challenge associated with the start-up strategy for the fuel injector itself. In particular, the injector will initially contain a volume of liquid fuel in the non-capillary portion of the fuel flow path. This section of the injector is referred to as the dead volume. FIG. 1 illustrates the dead volume 90 of the fuel injector 10. It is in this area where liquid fuel from previous usage is typically present upon start-up.

Although the fuel flowing through the capillary will be vaporized very quickly upon initial start-up, the liquid fuel in the dead volume 90 will not readily vaporize due to the associated thermal inertia in this portion of the injector 10. As a result, the initial start-up performance of the fuel injector 10 is generally subject to liquid droplet sizes that are larger than desired (i.e. greater than 30 microns). As shown in FIG. 2, the initial injection of liquid fuel droplets in this size range can result in rich fuel spikes 50 when the fuel injection strategy involves injecting fuel while the intake valve is open. At start-up, these rich fuel spikes 50 translate into increased engine emissions of unburned hydrocarbons relative to a start-up that would otherwise be conducted without rich fuel spikes.

Objects and Summary of the Preferred Forms

One object is to provide a fuel system having improved fuel vaporization characteristics under most engine operating conditions, particularly cold-start and warm-up conditions.

Another object is to provide a fuel injector and delivery system capable of reducing emissions and improving fuel efficiency.

Yet another object is to provide a fuel injector and a related methodology that can eliminate fuel rich spikes at startup thereby minimizing the emissions impact of initial fuel droplets.

It is a still further object of the present invention to provide such a fuel injector that eliminates fuel rich spikes at startup while satisfying the design constraints of rapid start-up and minimal power requirements.

These and other objects will become apparent from the detailed description of the preferred forms set out below and now summarized as follows:

A preferred form of the fuel system for use in an internal combustion engine is intended to accomplish at least one or more of the aforementioned objects. One such form includes a plurality of fuel injectors, each injector including (i) at least one capillary flow passage, the at least one capillary flow passage having an inlet end and an outlet end, (ii) a heat source arranged along the at least one capillary flow passage, the heat source operable to heat a liquid fuel in the at least one capillary flow passage to a level sufficient to convert at least a portion thereof from the liquid state to a vapor state, and (iii) a valve for metering fuel to the internal combustion engine, the valve located proximate to the outlet end of the at least one capillary flow passage, a liquid fuel supply system in fluid communication with the plurality of fuel injectors, a controller to control the power supplied to the heat source of each of the plurality of fuel injectors to achieve a predetermined target temperature, the predetermined target temperature operable to convert the portion of liquid fuel to the vapor state; means for determining engine air flow of the internal combustion engine, and a sensor for measuring a value indicative of degree of engine warm-up of the internal combustion engine, the sensor operatively connected to the controller; and wherein the portion of liquid fuel to be converted to the vapor state is controlled with reference to sensed internal combustion engine conditions to achieve minimal exhaust emissions.

The fuel system is effective in reducing cold-start and warm-up emissions of an internal combustion engine. Efficient combustion is promoted by forming an aerosol of fine droplet size when the substantially vaporized fuel condenses in air. The vaporized fuel can be supplied to a combustion chamber of an internal combustion engine during cold-start and warm-up of the engine and reduced emissions can be achieved.

One preferred form also provides a method for controlling a fuel system and delivering fuel to an internal combustion engine for a fuel system including at least one fuel injector having at least one capillary flow passage, a heat source arranged along the at least one capillary flow passage, the heat source capable of heating a liquid fuel in the at least one capillary flow passage to a level sufficient to convert at least a portion thereof from the liquid state to a vapor state, and a valve for metering fuel to the internal combustion engine, the valve located proximate to an outlet end of the at least one capillary flow passage. The method includes the steps of determining engine air flow of the internal combustion engine, measuring a value indicative of degree of engine warm-up of the internal combustion engine, determining a portion of liquid fuel to be converted to the vapor state by the at least one capillary flow passage, the determining step employing the measured values, controlling power supplied to the heat source of the at least one fuel injector to achieve a predetermined target temperature, the predetermined target temperature operable to convert the portion of liquid fuel to the vapor state so determined and delivering the fuel to a combustion chamber of the internal combustion engine and wherein the portion of liquid fuel to be converted to the vapor state is determined to achieve minimal exhaust emissions.

According to one preferred form, the capillary flow passage can include a capillary tube and the heat source can include a resistance heating element or a section of the tube heated by passing electrical current therethrough. The fuel supply can be arranged to deliver pressurized or non-pressurized liquid fuel to the flow passage. The apparatus can provide a stream of vaporized fuel that mixes with air and forms an aerosol having a mean droplet size of 25 μm or less.

Further according to the present invention, a method of eliminating fuel rich spikes at startup is provided through a design in which initial liquid fuel is purged from the injector at startup such that unburned hydrocarbons are minimized. This methodology calls for an adjustment in injection timing such that the initial fuel pulse is injected against a closed intake valve while the engine cranks and the capillary heats up.

BRIEF DESCRIPTION OF THE DRAWINGS

The invention will now be described in more detail with reference to preferred forms of the invention, given only by way of example, and with reference to the accompanying drawings, in which.

DETAILED DESCRIPTION OF THE PREFERRED EMBODIMENTS

Figure 1:
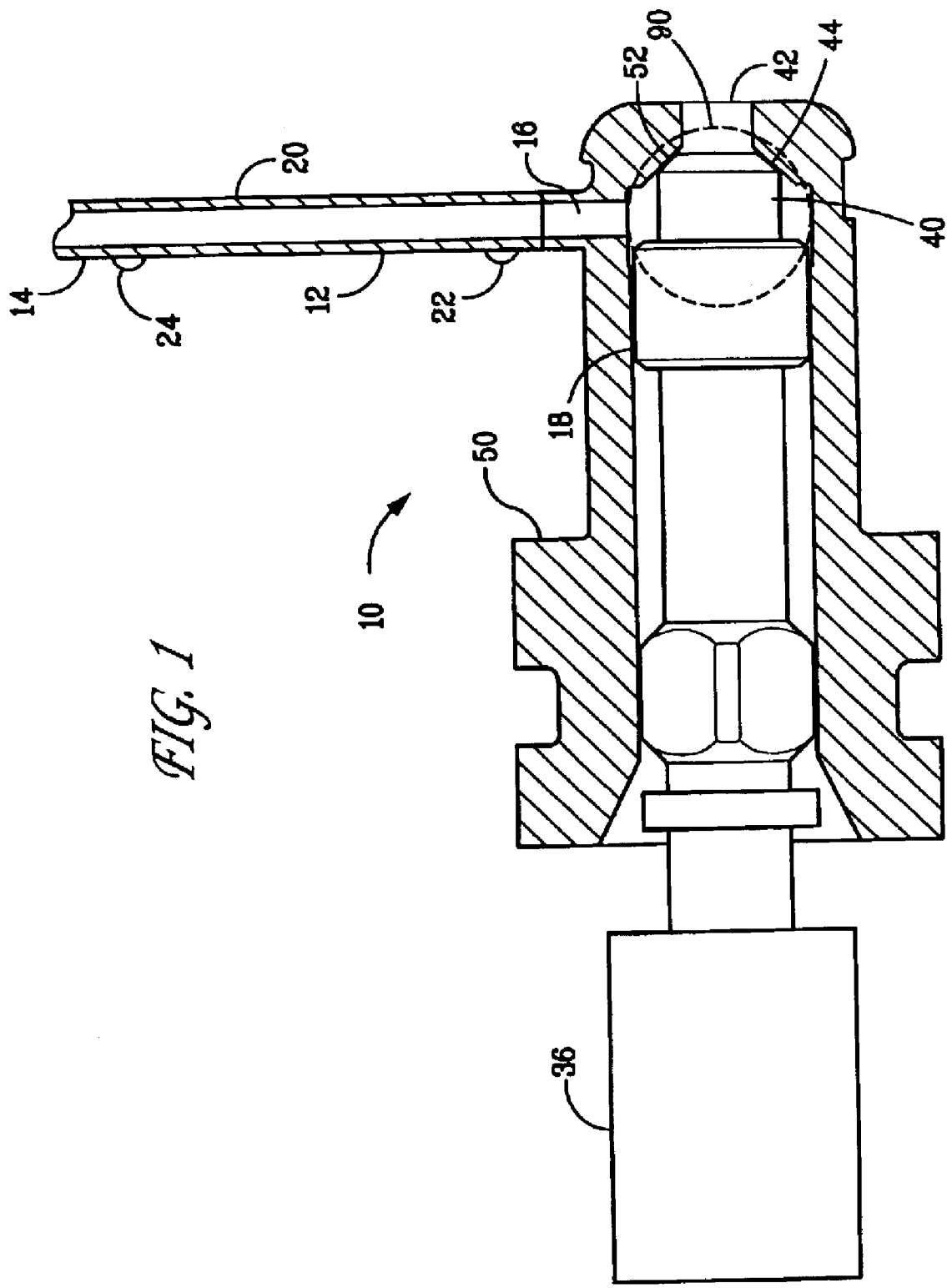
FIG. 1 is a schematic of a fuel injector illustrating the dead volume therein and the location of liquid fuel at startup.

Reference is now made to the embodiments illustrated in FIGS. 1–10 wherein like numerals are used to designate like parts throughout.

Provided is a fuel system and method for its control that is useful for cold-start, warm-up and normal operation of an internal combustion engine. The fuel system includes a fuel injector having a capillary flow passage, capable of heating liquid fuel so that substantially vaporized fuel is supplied into an engine cylinder. The substantially vaporized fuel can be combusted with reduced emissions compared to conventional fuel injector systems. Furthermore, the fuel system requires less power, and has shorter warm-up times than other vaporization techniques. Additionally, the fuel system operates to eliminate fuel rich spikes at startup using an adjusted fuel injection timing methodology as further described herein.

In general, gasolines do not readily vaporize at low temperatures. During the cold start and warm-up period, relatively little vaporization of the liquid fuel takes place. As such, it is necessary to provide an excess of liquid fuel to each cylinder of the engine in order to achieve an air/fuel mixture that will combust. Upon ignition of the fuel vapor, which is generated from the excess of liquid fuel, combustion gases discharged from the cylinders include unburned fuel and undesirable gaseous emissions. However, upon reaching normal operating temperature, the liquid fuel readily vaporizes, so that less fuel is needed to achieve an air/fuel mixture that will readily combust. Advantageously, upon reaching normal operating temperature, the air/fuel mixture can be controlled at or near the stoichiometric ratio, thereby reducing emissions of unburned hydrocarbons and carbon monoxide. Additionally, when fueling is controlled at or near the stoichiometric ratio, just enough air is available in the exhaust stream for simultaneous oxidation of unburned hydrocarbons and carbon monoxide and reduction of nitrogen oxides over a three-way catalyst (TWC).

The system and method of the present invention injects fuel that has been substantially vaporized into the intake flow passage, or directly into an engine cylinder, thereby eliminating the need for excess fuel during the start-up and warm-up period of an engine. The fuel is preferably delivered to the engine in a stoichiometric or fuel-lean mixture, with air, or air and diluent, so that virtually all of the fuel is burned during the cold start and warm-up period.

With conventional port-fuel injection, over-fueling is required to ensure robust, quick engine starts. Under fuel-rich conditions, the exhaust stream reaching the three-way catalyst does not contain enough air to oxidize the excess fuel and unburned hydrocarbons as the catalyst warms up. One approach to address this issue is to utilize an air pump to supply additional air to the exhaust stream upstream of the catalytic converter. The objective is to generate a stoichiometric or slightly fuel-lean exhaust stream that can react over the catalyst surface once the catalyst reaches its light-off temperature. In contrast, the system and method of the present invention enables the engine to operate at stoichiometric or even slightly fuel-lean conditions during the cold-start and warm-up period, eliminating both the need for over-fueling and the need for an additional exhaust air pump, reducing the cost and complexity of the exhaust after treatment system.

Another approach to address catalyst warm-up during the cold start and warm-up period, is to deliberately operate the engine very fuel-rich during this period. Using an exhaust air-pump to supply air in this fuel-rich exhaust stream, a combustible mixture can be generated which is burned either by auto-ignition or by some ignition source upstream of, or in, the catalytic converter. The exotherm produced by this oxidation process significantly heats up the exhaust gas and the heat is largely transferred to the catalytic converter as the exhaust passes through the catalyst. Using the system and method of the present invention, the engine could be controlled to operate alternating cylinders fuel-rich and fuel-lean to achieve the same effect but without the need for an air pump. For example, with a four-cylinder engine, two cylinders could be operated fuel-rich during the cold-start and warm-up period to generate unburned hydrocarbons in the exhaust. The two remaining cylinders would be operated fuel-lean during cold-start and warm-up, to provide oxygen in the exhaust stream.

A fuel system according to the invention includes at least one capillary-sized flow passage through which pressurized fuel flows before being injected into an engine for combustion. A capillary-sized flow passage can be provided with a hydraulic diameter that is preferably less than 2 mm, more preferably less than 1 mm, and most preferably less than 0.5 mm. Hydraulic diameter is used in calculating fluid flow through a fluid carrying element. Hydraulic radius is defined as the flow area of the fluid-carrying element divided by the perimeter of the solid boundary in contact with the fluid (generally referred to as the "wetted" perimeter). In the case of a fluid carrying element of circular cross section, the hydraulic radius when the element is flowing full is $(\pi D^2/4)/\pi D = D/4$. For the flow of fluids in noncircular fluid carrying elements, the hydraulic diameter is used. From the definition of hydraulic radius, the diameter of a fluid-carrying element having circular cross section is four times its hydraulic radius. Therefore, hydraulic diameter is defined as four times the hydraulic radius.

Heat is applied along the capillary passageway, resulting in at least a portion of the liquid fuel that enters the flow passage being converted to a vapor as it travels along the passageway. The fuel exits the capillary passageway substantially as a vapor, which optionally contains a minor proportion of heated liquid fuel, which has not been vaporized. By substantially vaporized, it is meant that at least 50% of the volume of the liquid fuel is vaporized by the heat source, more preferably at least 70%, and most preferably at least 80% of the liquid fuel is vaporized. Although it may be difficult to achieve 100% vaporization due to complex physical effects that take place, nonetheless complete vaporization would be desirable. These complex physical effects include variations in the boiling point of the fuel since the boiling point is pressure dependent and pressure can vary in the capillary flow passage. Thus, while it is believed that a major portion of the fuel reaches the boiling point during heating in the capillary flow passage, some of the liquid fuel may not be heated enough to be fully vaporized with the result that a portion of the liquid fuel passes through the outlet of the capillary flow passage along with the vaporized fluid.

The capillary-sized fluid passage is preferably formed in a capillary body such as a single or multilayer metal, ceramic or glass body. The passage has an enclosed volume opening to an inlet and an outlet either of which, or both, may be open to the exterior of the capillary body or may be connected to another passage within the same body or another body or to fittings. The heater can be formed by a portion of the body such as a section of a stainless steel tube or the heater can be a discrete layer or wire of resistance heating material incorporated in or on the capillary body. The fluid passage may be any shape comprising an enclosed volume opening to an inlet and an outlet and through which a fluid may pass. The fluid passage may have any desired cross-section with a preferred cross-section being a circle of uniform diameter. Other capillary fluid passage cross-sections include non-circular shapes such as triangular, square, rectangular, oval or other shape and the cross section of the fluid passage need not be uniform. The fluid passage can extend rectilinearly or non-rectilinearly and may be a single fluid passage or multi-path fluid passage. In the case where the capillary passage is defined by a metal capillary tube, the tube can have an inner diameter of 0.01 to 3 mm, preferably 0.1 to 1 mm, most preferably 0.15 to 0.5 mm. Alternatively, the capillary passage can be defined by transverse cross sectional area of the passage, which can be $8 \times 10^{-5}$ to 7 $mm^2$, preferably $8 \times 10^{-3}$ to $8 \times 10^{-1}$ $mm^2$ and more preferably $2 \times 10^{-2}$ to $2 \times 10^{-1}$ $mm^2$. Many combinations of a single or multiple capillaries, various pressures, various capillary lengths, amounts of heat applied to the capillary, and different cross-sectional areas will suit a given application.

The liquid fuel can be supplied to the capillary flow passage under a pressure of at least 10 psig, preferably at least 20 psig. In the case where the capillary flow passage is defined by the interior of a stainless steel tube having an internal diameter of approximately 0.020 inch and a length of approximately 6 inches, the fuel is preferably supplied to the capillary passageway at a pressure of 100 psig or less to achieve mass flow rates required for stoichiometric start of a typical size automotive engine cylinder (on the order of 100–200 mg/s). The at least one capillary passageway provides a sufficient flow of substantially vaporized fuel to ensure a stoichiometric or nearly stoichiometric mixture of fuel and air that can be ignited and combusted within the cylinder(s) of an engine without producing undesirably high levels of unburned hydrocarbons or other emissions. The capillary tube also is characterized by having a low thermal inertia, so that the capillary passageway can be brought up to the desired temperature for vaporizing fuel very quickly, preferably within 2.0 seconds, more preferably within 0.5 second, and most preferably within 0.1 second, which is beneficial in applications involving cold starting an engine. The low thermal inertia also could provide advantages during normal operation of the engine, such as by improving the responsiveness of the fuel delivery to sudden changes in engine power demands.

During vaporization of liquid fuel in a heated capillary passage, deposits of carbon and/or heavy hydrocarbons can accumulate on the capillary walls and the flow of the fuel can be severely restricted which ultimately can lead to clogging of the capillary flow passage. The rate at which these deposits accumulate is a function of capillary wall temperature, fuel flow rate and fuel type. It is believed that fuel additives may be useful in reducing such deposits. However, should clogging develop, such clogging can be cleared by oxidizing the deposits.

Figure 3:
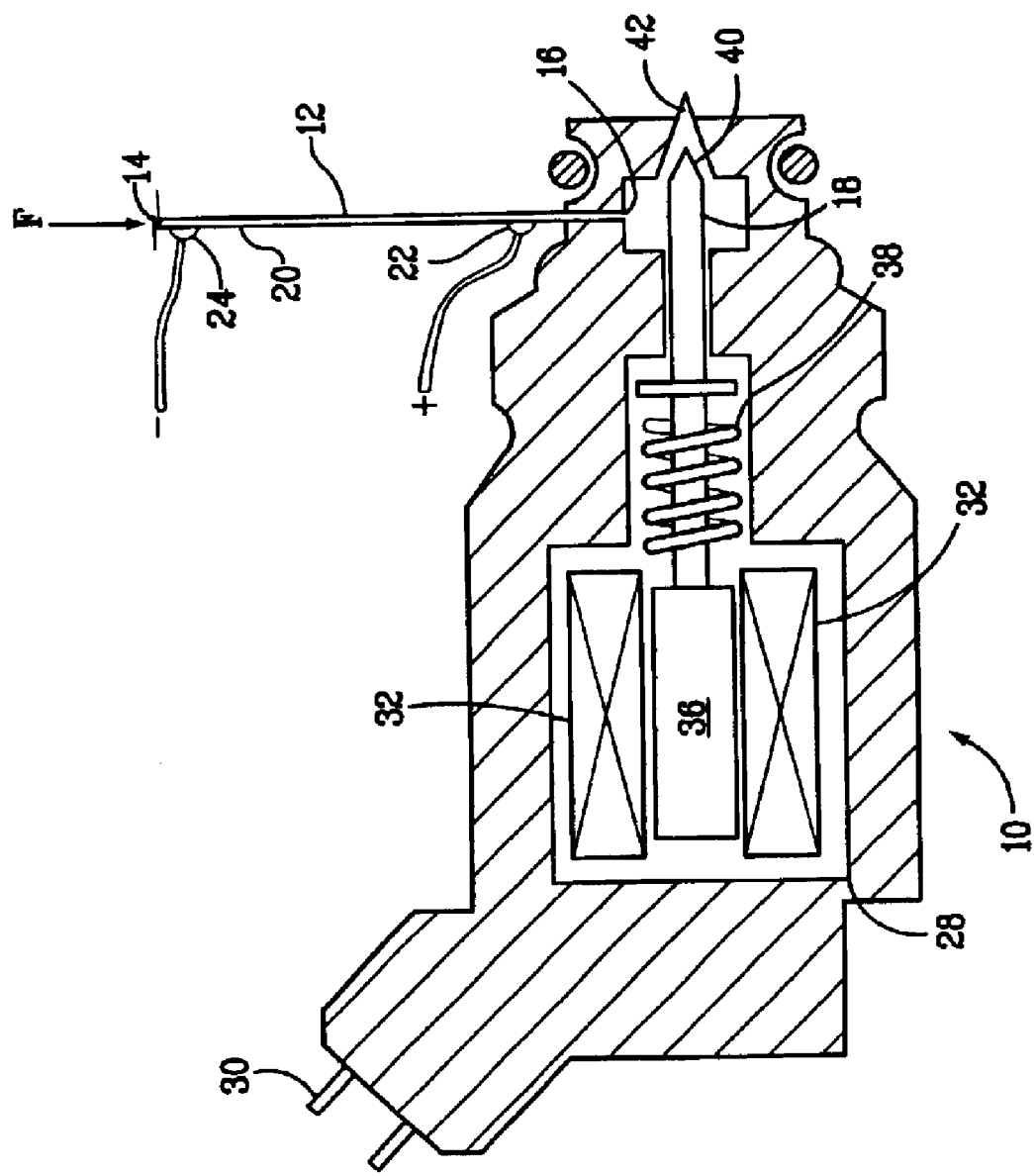
FIG. 3 illustrates an in-line-heated injector having an electrically heated capillary, in partial cross section, incorporated upstream of a modified conventional side-fed port fuel injector, in accordance with a preferred form.

FIG. 3 presents a fuel injector 10 for vaporizing a liquid fuel drawn from a source of liquid fuel, in accordance with the present invention. Apparatus 10 includes a capillary flow passage 12, having an inlet end 14 and an outlet end 16, inlet end 14 in fluid communication with a liquid fuel source F for introducing the liquid fuel in a substantially liquid state into capillary flow passage 12.

As is preferred, a needle valve assembly 18 is operated by solenoid 28. Solenoid 28 has coil windings 32 connected to electrical connector 30. When the coil windings 32 are energized, the solenoid element 36 is drawn into the center of coil windings 32. When electricity is cut off from the coil windings 32, a spring 38 returns the solenoid element to its original position. A needle 40 is connected to the solenoid element 36. Movement of the solenoid element 36, caused by applying electricity to the coil windings 32, causes the needle 40 to be drawn away from an orifice 42 allowing fuel to flow through the orifice 42.

A heat source 20 is arranged along capillary flow passage 12. As is most preferred, heat source 20 is provided by forming capillary flow passage 12 from a tube of electrically resistive material, a portion of capillary flow passage 12 forming a heater element when a source of electrical current is connected to the tube at connections 22 and 24 for delivering current therethrough. Heat source 20, as may be appreciated, is then operable to heat the liquid fuel in capillary flow passage 12 to a level sufficient to change at least a portion thereof from a liquid state to a vapor state and deliver a stream of substantially vaporized fuel from outlet end 16 of capillary flow passage 12.

The heated capillary flow passage 12, in accordance with the invention can produce a vaporized stream of fuel, which condenses in air to form a mixture of vaporized fuel, fuel droplets, and air commonly referred to as an aerosol. Compared to a conventional automotive port-fuel injector, which delivers a fuel spray comprised of droplets in the range of 150 to 200 $\mu$m Sauter Mean Diameter (SMD), the aerosol has an average droplet size of less than 25 $\mu$m SMD, preferably less than 15 $\mu$m SMD. Thus, the majority of the fuel droplets produced by the heated capillary according to the invention can be carried by an air stream, regardless of the flow path, into the combustion chamber.

The difference between the droplet size distributions of a conventional injector and the heated capillary flow passage according to the invention is particularly critical during cold-start and warm-up conditions. Specifically, using a conventional port-fuel injector, relatively cold intake manifold components necessitate over-fueling such that a sufficient fraction of the large fuel droplets, impinging on the intake components, are evaporated to produce an ignitable fuel/air mixture. Conversely, the vaporized fuel and fine droplets produced by the fuel injector of the present invention are essentially unaffected by the temperature of engine components upon start-up and, as such, eliminate the need for over-fueling during engine start-up conditions. The elimination of over-fueling combined with more precise control over the fuel/air ratio to the engine afforded through the use of the heated capillary injector of the present invention results in greatly reduced cold start emissions compared to those produced by engines employing conventional fuel injector systems. In addition to a reduction in over-fueling, it should also be noted that the heated capillary injector according to the invention further enables fuel-lean operation during cold-start and warm-up, which results in a greater reduction in tailpipe emissions while the catalytic converter warms up.

Referring still to FIG. 3, capillary flow passage 12 can comprise a metal tube such as a stainless steel capillary tube and the heater comprising a length of the tube 20 through which electrical current is passed. In a preferred embodiment, the capillary tube is provided with an internal diameter of approximately 0.02 to 0.03 inches, a heated length of approximately 1 to 10 inches, and fuel can be supplied to the tube 12 at a pressure of less than 100 psig, preferably less than 70 psig, more preferably less than 60 psig and even more preferably less than 45 psig. It has been shown that this embodiment produces vaporized fuel that forms a distribution of aerosol droplets that mostly range in size from 2 to 30 $\mu$m SMD with an average droplet size of about 5 to 15 $\mu$m SMD, when the vaporized fuel is condensed in air at ambient temperature. The preferred size of fuel droplets to achieve rapid and nearly complete vaporization at cold-starting temperatures is less than about 25 $\mu$m. This result can be achieved by applying approximately 100 to 400 W, e.g., 200 W of electrical power, which corresponds to 2–3% of the energy content of the vaporized fuel, to a six-inch stainless steel capillary tube. The electrical power can be applied to the capillary tube by forming the tube entirely from an electrically conductive material such as stainless steel, or by providing a conductive material over at least a portion of a non-electrically conducting tube or laminate having a flow passage therein such as by laminating or coating an electrically resistive material to form a resistance heater on the tube or laminate. The resistive component of the capillary is chosen based on the material's temperature coefficient of resistance. The temperature of the material can be controlled by applying power to achieve a target resistance. Electrical leads can be connected to the electrically conductive material to supply the electrical current to the heater so as to heat the tube along its length. Alternatives for heating the tube along its length could include inductive heating, such as by an electrical coil positioned around the flow passage, or other sources of heat positioned relative to the flow passage to heat the length of the flow passage through one or a combination of conductive, convective or radiative heat transfer.

Although, a preferred capillary tube has a heated length of approximately 6 inches and an internal diameter of approximately 0.020 inches, other configurations of capillaries provide acceptable vapor quality. For example, the internal diameter can range from 0.02 to 0.03 inch and the heated portion of the capillary tube can range from 1 to 10 inches.

After cold-start and warm-up, it is not necessary to heat the capillary tube such that the unheated capillary tube can be used to supply adequate liquid fuel to an engine operating at normal temperature.

The vaporized fuel exiting from the fuel capillary according to the invention can be injected into an engine intake manifold at the same location as existing port-fuel injectors or at another location along the intake manifold. If desired, however, the fuel capillary can be arranged to deliver vaporized fuel directly into each cylinder of the engine. The fuel capillary provides advantages over systems that produce larger droplets of fuel that must be injected against the back side of a closed intake valve while starting the engine. Preferably, the outlet of the fuel capillary tube is positioned flush with the intake manifold wall similar to the arrangement of the outlets of conventional fuel injectors.

After approximately 20 seconds (or preferably less) from starting the engine, the power used to heat the capillary flow passage 12 can be turned off and liquid injection initiated using conventional fuel injectors, for normal engine operation. Normal engine operation can alternatively be performed by liquid fuel injection through an unheated capillary flow passage 12 via continuous injection or possibly pulsed injection.

Figure 4:
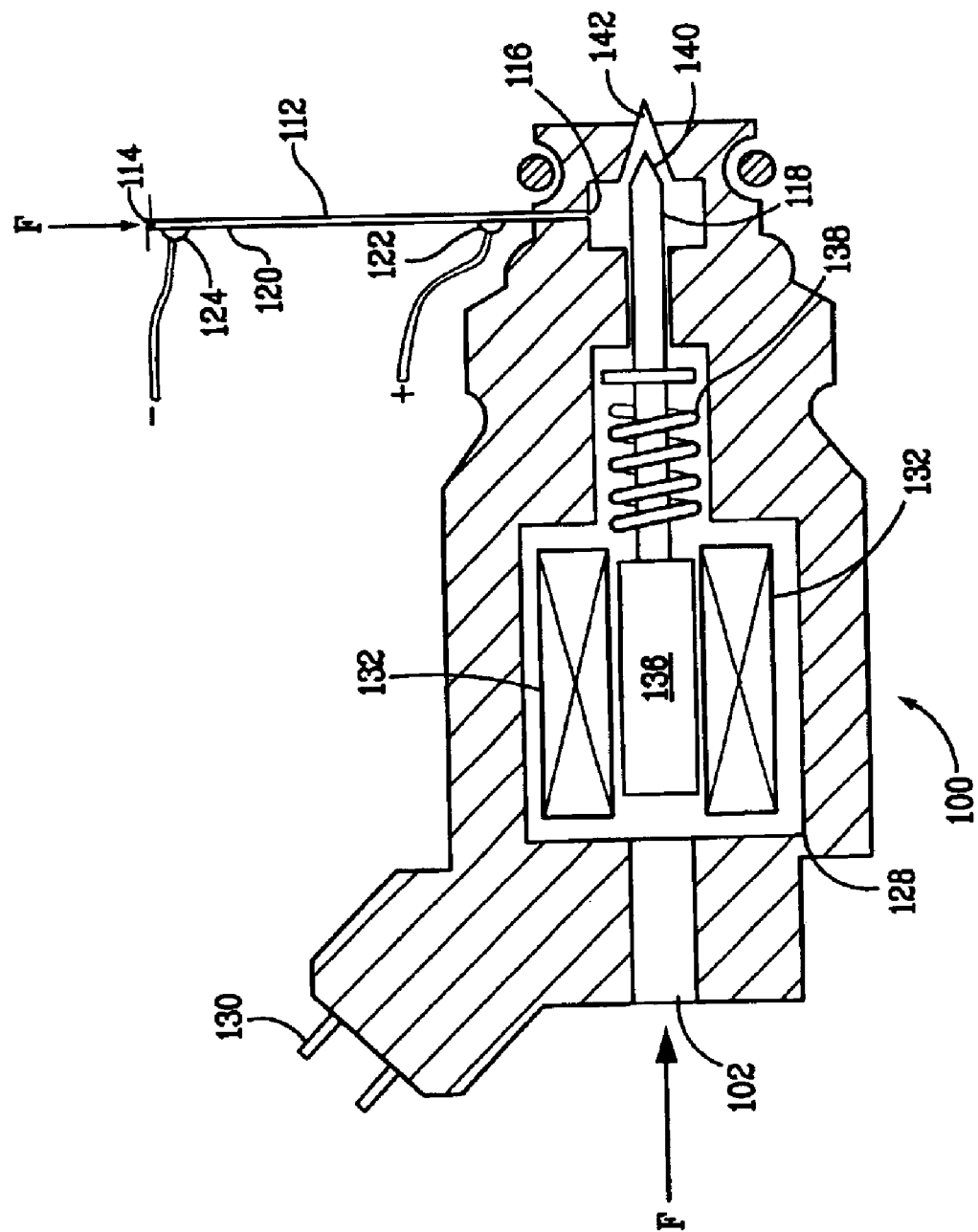
FIG. 4 presents another vapor-liquid in-line-heated injector having an electrically heated capillary, in partial cross section, capable of also providing a stream of liquid fuel according to another preferred form.

Referring to FIG. 4, a dual vapor/liquid fuel injector 100, in accordance with the present invention, is shown. Vapor/liquid fuel injector 100 includes a capillary flow passage 112, having an inlet end 114 and an outlet end 116, inlet end 114 in fluid communication with a liquid fuel source F for introducing the liquid fuel in a substantially liquid state into capillary flow passage 112 and liquid passage 102.

A needle valve assembly 118 is operated by solenoid 128 and is used to control the flow of fuel from capillary flow passage 112 and/or liquid passage 102. Solenoid 128 has coil windings 132 connected to electrical connector 130. When the coil windings 132 are energized, the solenoid element 136 is drawn into the center of coil windings 132. As previously described, when electricity is cut off from the coil windings 132, a spring 138 returns the solenoid element to its original position. A needle 140 is connected to the solenoid element 136. Movement of the solenoid element 136, caused by applying electricity to the coil windings 132, causes the needle 140 to be drawn away from an orifice 142 allowing fuel to flow through the orifice 142.

A heat source 120 is arranged along capillary flow passage 112. As is most preferred, heat source 120 is provided by forming capillary flow passage 112 from a tube of electrically resistive material, a portion of capillary flow passage 112 forming a heater element when a source of electrical current is connected to the tube at connections 122 and 124 for delivering current. Heat source 120, as may be appreciated, is then operable to heat the liquid fuel in capillary flow passage 112 to a level sufficient to change at least a portion thereof from a liquid state to a vapor state and deliver a stream of substantially vaporized fuel from outlet end 116 of capillary flow passage 112. After about 20 seconds from starting the engine, or preferably less, flow to the capillary flow passage 112 can be terminated and the conventional liquid passage 102 activated for continued operation of the engine.

Figure 5:
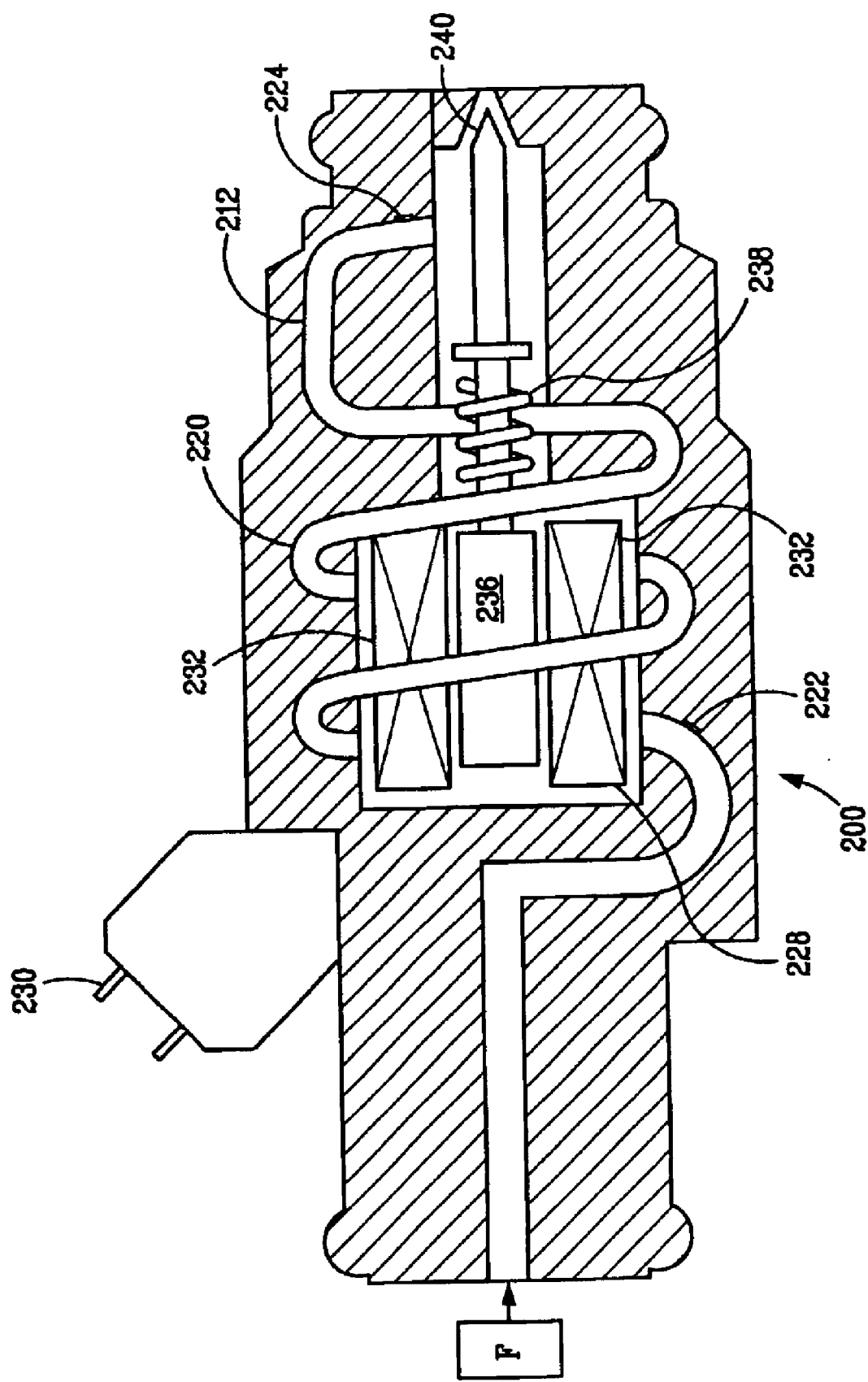
FIG. 5 is a cross-sectional view of another embodiment of the fuel injector according to yet another preferred form.

Referring now to FIG. 5, yet another exemplary embodiment of the present invention is shown. A fuel injector 200 has a non-linear (helical) heated capillary flow passage 212 which is coiled within the interior of the fuel injector 200 as illustrated in FIG. 5. In this embodiment, the capillary flow passage 212 is coiled around the solenoid assembly 228 and is heated along heated length 220, defined by electrical connections 222 and 224. This embodiment is useful in a situation where space is limited and a linear capillary tube is not feasible. In addition, this embodiment could be adapted for use with a conventional fuel injector (see FIG. 6) for delivering fuel to an engine during normal operating conditions.

Figure 6:
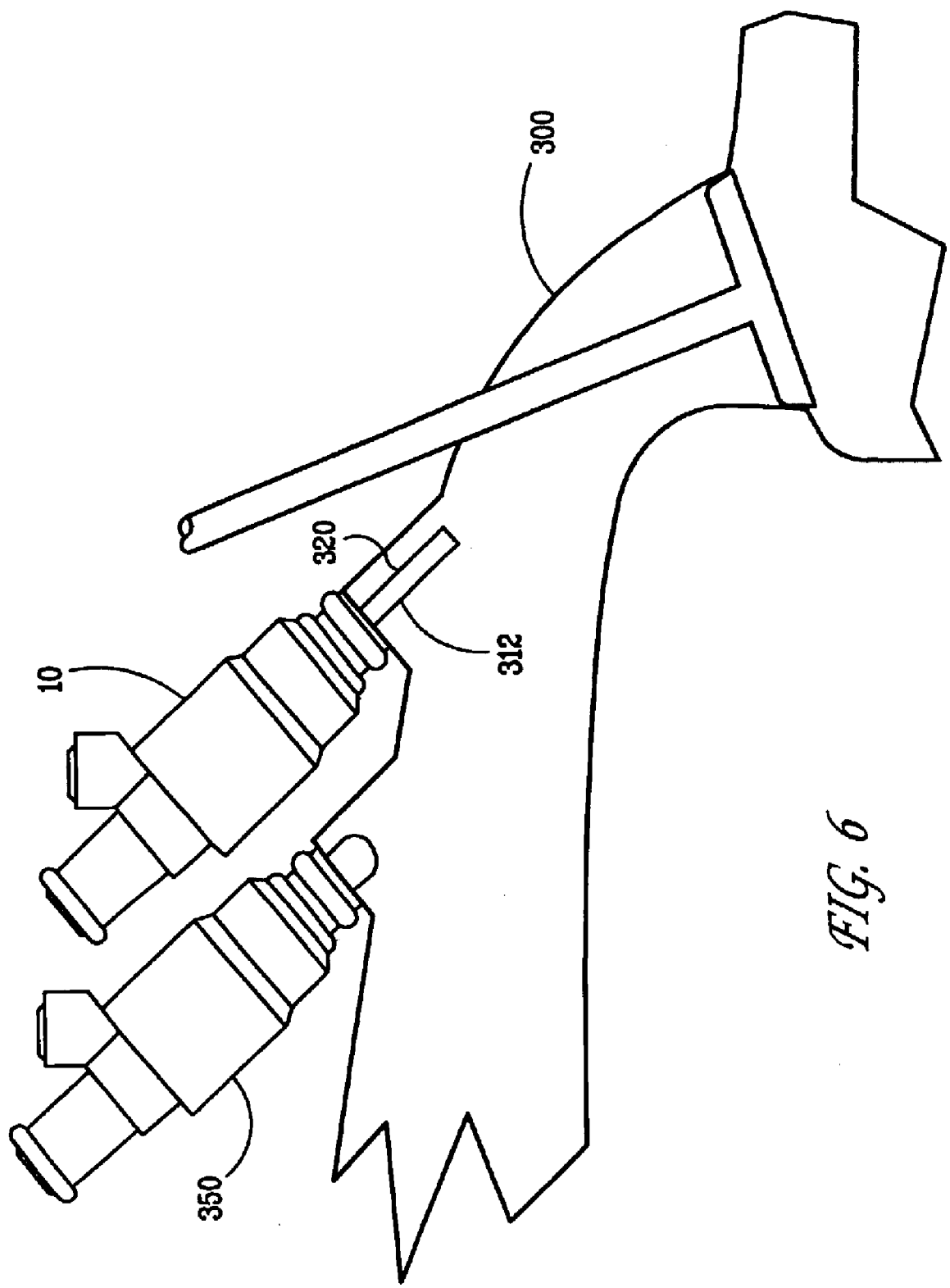
FIG. 6 is a side view of both a heated capillary fuel injector and a conventional fuel injector also showing a valve in the closed position.

Referring now to FIG. 6, an engine intake port 300 is fitted with a heated capillary injector 10 (of the type described with reference to FIG. 1) and a conventional liquid fuel injector 350. In this embodiment, fuel will be delivered to the engine by the capillary flow passage 312, heated along its length 320, during the cold-start and warm-up of the engine. After the first approximately 20 seconds from starting the engine, or preferably less, the heated capillary injector 10 will be deactivated and the conventional fuel injector 350 activated for normal operation of the engine.

FIG. 6 also illustrates the methodology for purging fuel from the injector on startup according to the teachings of the present invention. It will be readily understood that while FIG. 6 includes both a heated capillary injector 10 and conventional fuel injector 350, the purging methodology may, instead, be implemented with a single heated injector without a conventional fuel injector. Further, the purging methodology next discussed may be employed with multiple heated capillary fuel injectors of the type discussed above.

The method for purging liquid fuel initially contained in the dead volume of the fuel injector is now discussed. By employing this methodology, unburned hydrocarbons emissions resulting from leftover fuel may be greatly reduced. According to this method, first, fuel injection timing of the vaporizing injector may be adjusted (by appropriately programming control system 400 as discussed below) such that the initial fuel pulse is injected against intake valve 325 while it is in the closed position. As a result, the initial liquid fuel left over in heated capillary injector 10 will be deposited on the back of intake valve 325 and will not be injected into the cylinder.

While this initial fuel pulse is conducted, in a preferred embodiment of the present invention, the capillary channel (s) in the heated fuel injector(s) are heated to the designated target temperature. Following the initial purging of the liquid fuel in the heated fuel injector 10 (and possibly other heated fuel injectors), the associated capillary channels will be at the target temperature which is sufficient to supply substantially vaporized fuel to the cylinder(s). At this point in the control strategy, the vaporized fuel can be injected against intake valve 325 in either its open or closed position without substantially impacting the engine-out unburned hydrocarbon emission levels.

Unlike conventional fuel injection strategies in which liquid fuel forms a puddle on the back of intake vale 325, the initial liquid fuel from the fuel injector 10 forms a thin film on the back of intake valve 325. This difference is significant since the evaporation of the thin liquid film does not appreciably change the air to fuel ratio to the engine and, as such, the unburned hydrocarbon emission levels remain relatively unaffected.

Figure 2:
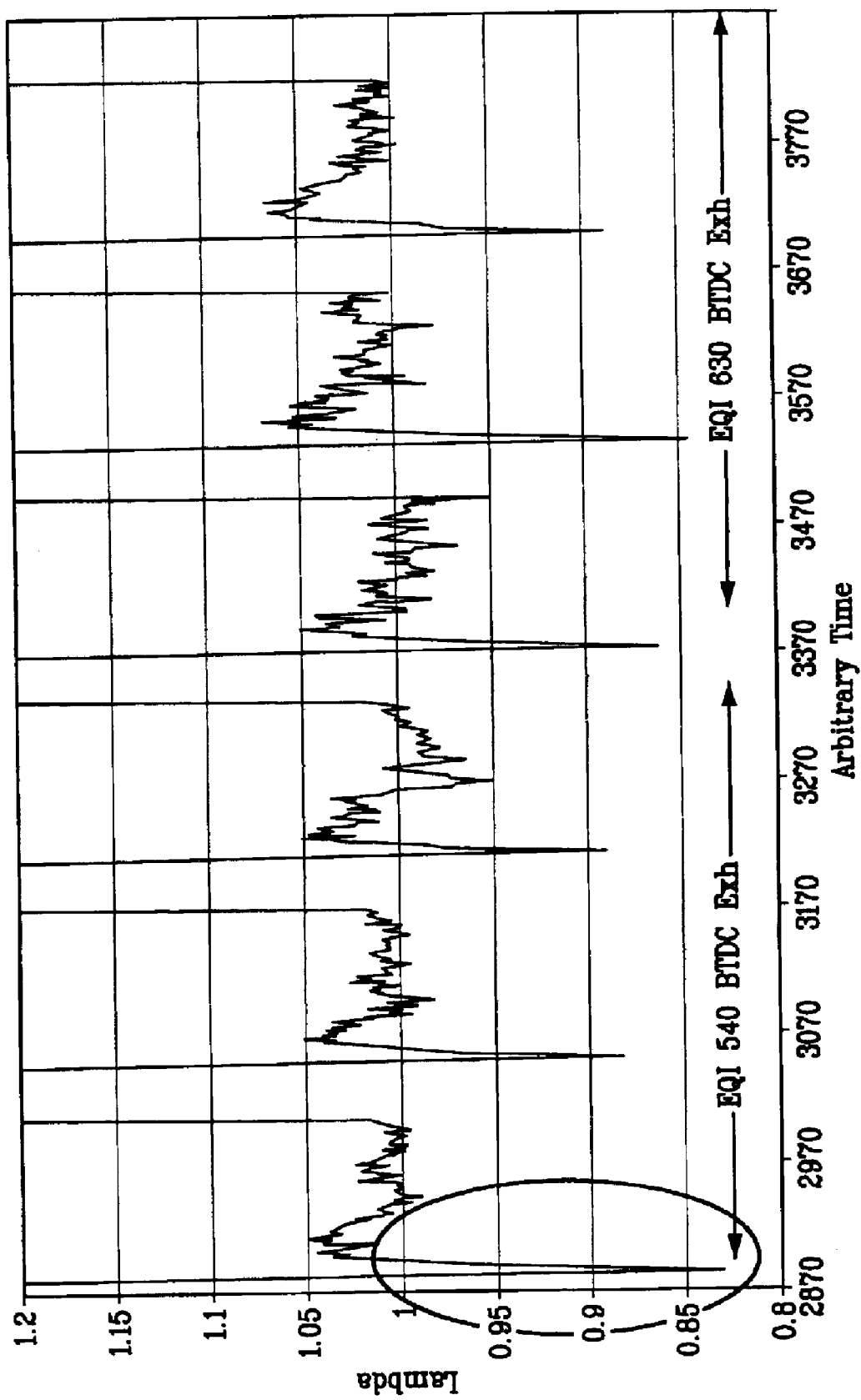
FIG. 2 is a graph illustrating rich fuel spikes that occur in prior art injectors and which correspond to initial injection using an open intake valve injection startup strategy.
Figure 7:
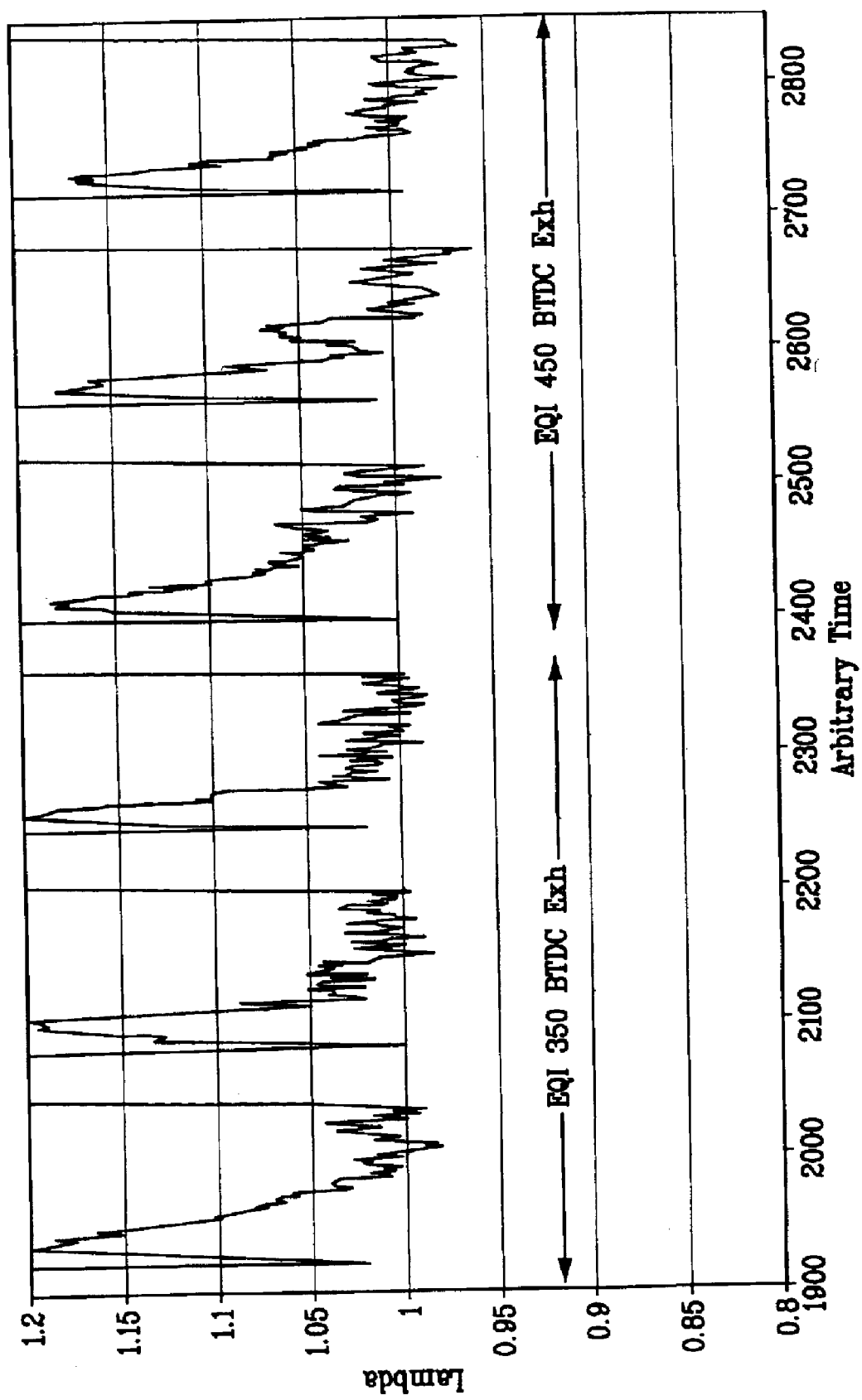
FIG. 7 is an air/fuel trace reflecting the start-up fuel injection strategy of the present invention.
Figure 8:
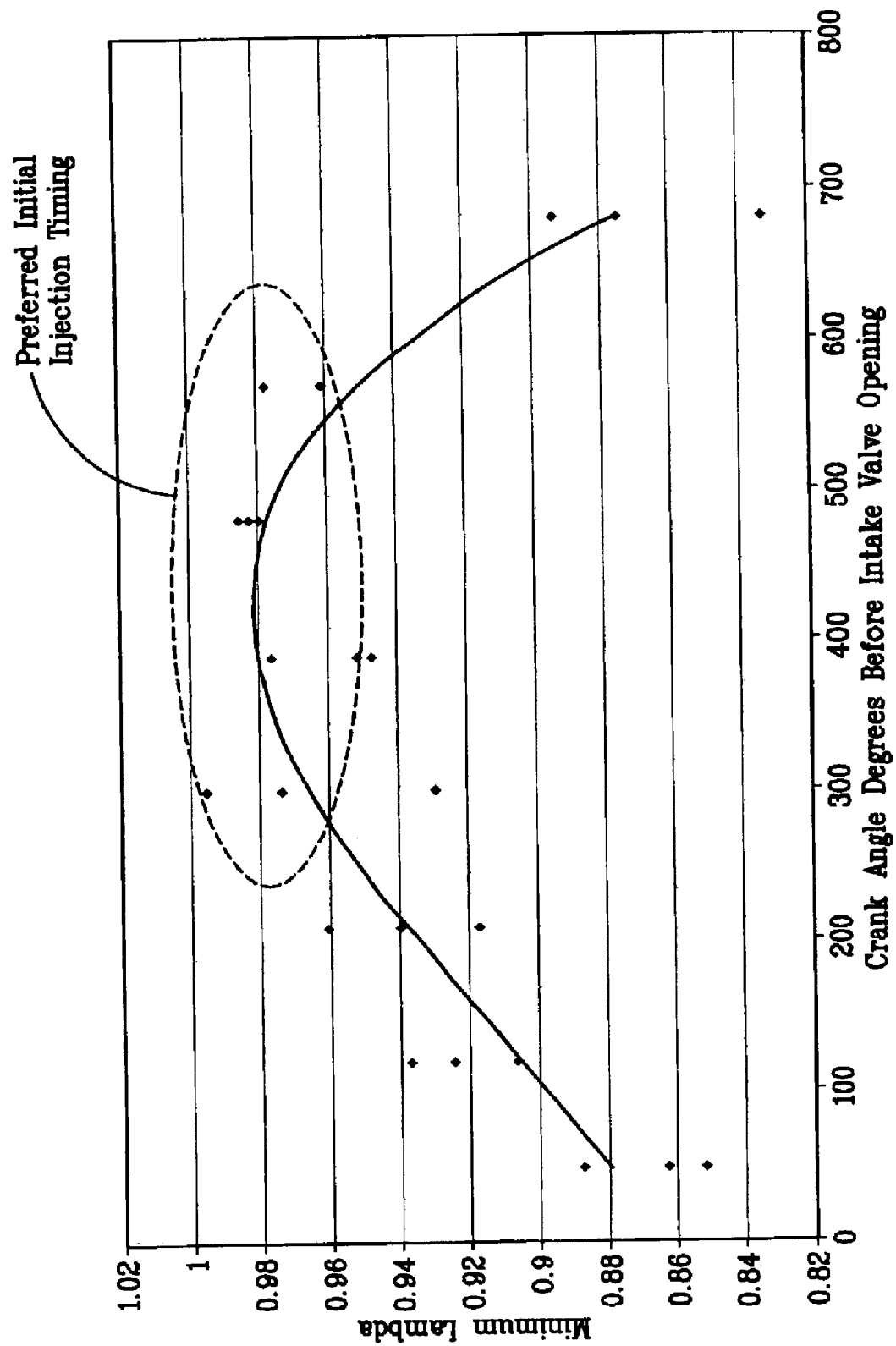
FIG. 8 is a graph illustrating a direct comparison of the minimal air/fuel ratio as a function of the end of injection according to the teachings of the present invention.

The impact of this fuel injection strategy on the air to fuel ratio to the engine is shown in FIG. 7. The results shown in FIG. 7, as well as those presented in FIGS. 2 and 8, are for a sequence of cold-idle injector "cut-in" tests. In these tests, the engine is motored while the coolant is kept at a relatively cool temperature and, at the beginning of each test, the injectors are turned on). As can be seen by comparing FIG. 7 (reflecting the fuel injection strategy of the present invention) with FIG. 2 (reflecting the prior art fuel injection strategy), rich fuel injection spikes are significantly reduced using the teachings of the present invention. Further, it is known that such an elimination of rich fuel injection spikes translates into a reduction in engine-out unburned hydrocarbon emissions.

Referring to FIG. 8, a direct comparison of the minimal observed lambda (air/fuel) value as a function of the end of injection is provided. FIG. 8 further serves to illustrate the advantages of the present invention wherein the initial liquid in the injector dead volume is purged against a closed intake valve. Once again, the results presented in FIG. 8 pertain to a sequence of cold-idle injector "cut-in" tests, wherein the engine is motored while the coolant is kept at a relatively cool temperature and, at the beginning of each test, the injectors are turned on).

Figure 9:
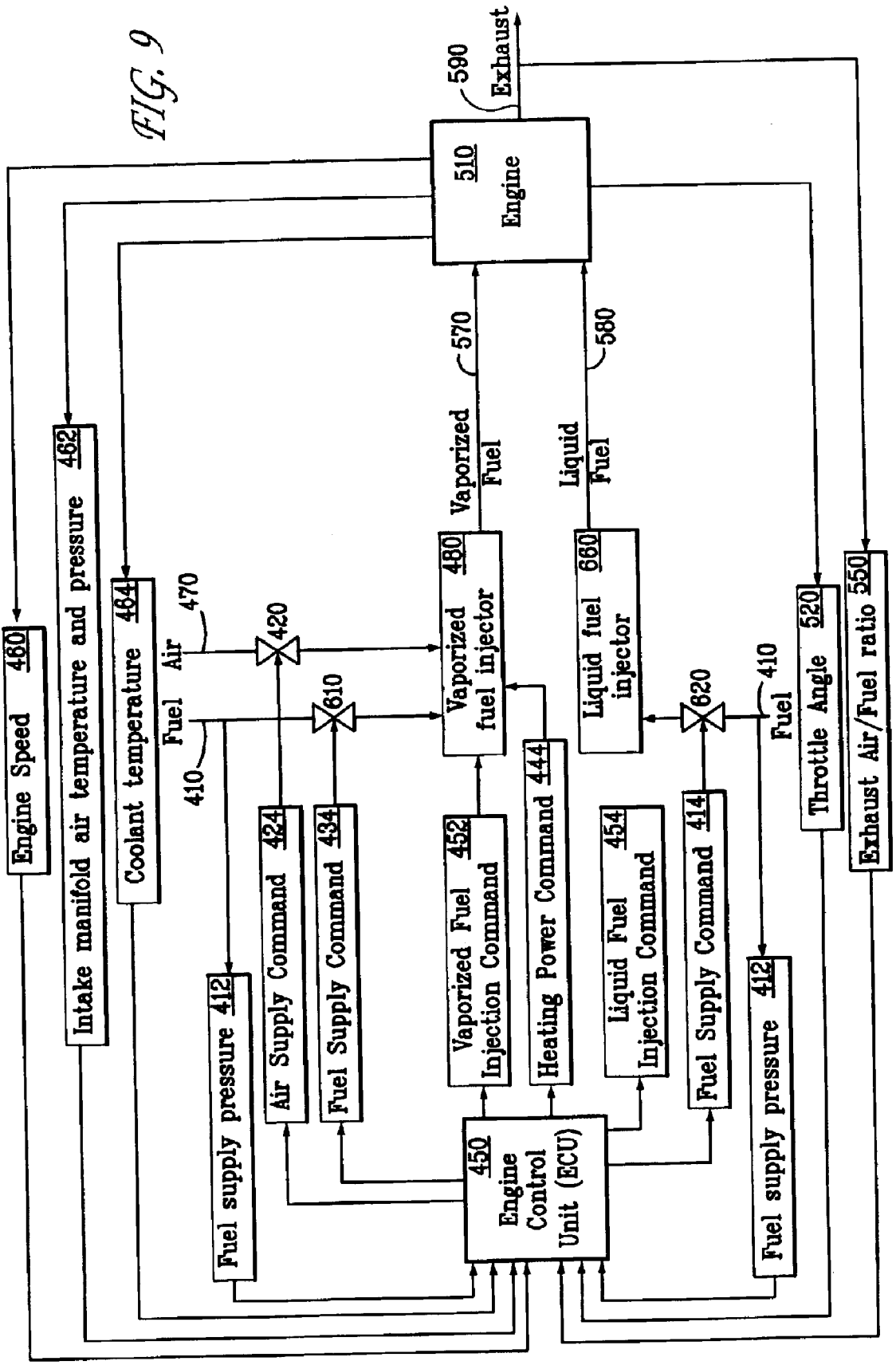
FIG. 9 is a schematic of a fuel delivery and engine/controller system in which a separate vapor fuel injector is used in conjunction with a conventional fuel injector.

FIG. 9 shows an exemplary schematic of a control system 400 used to operate an internal combustion engine 510 incorporating a liquid fuel supply valve 620 in fluid communication with a liquid fuel supply 410 and a liquid fuel injection path 660, a fuel supply valve 610 in fluid communication with a liquid fuel supply 410 and capillary flow passages 480, and an oxidizing gas supply valve 420 in fluid communication with an oxidizing gas supply 470 and capillary flow passages 480. The control system includes a controller 450 which typically receives a plurality of input signals from a variety of engine sensors such as engine speed sensor 460, intake manifold air temperature and pressure sensors 462, coolant temperature sensor 464, exhaust air-fuel ratio sensor 550, fuel supply pressure 412, etc. In operation, the controller 450 executes a control algorithm based on one or more input signals and subsequently generates an output signal 424 to the oxidizer supply valve 420 for cleaning clogged capillary passages in accordance with the invention, an output signal 414 to the liquid fuel supply valve 620, an output signal 434 to the fuel supply valve 610, and a heating power command 444 to a power supply which delivers power to heat to the capillaries 480.

In operation, the system according to the invention can be configured to feed back heat produced during combustion through the use of exhaust gas recycle heating, such that the liquid fuel is heated sufficiently to substantially vaporize the liquid fuel as it passes through the capillary flow passages 480 reducing or eliminating or supplementing the need to electrically or otherwise heat the capillary flow passages 480.

As may be seen, in the configuration of FIG. 9, the input signals to the engine control unit (ECU) 450, respectively, include fuel supply pressure 412, coolant temperature 464, intake manifold air temperature and pressure 462, engine speed 460, throttle angle 520, and exhaust air/fuel ratio 550. Similarly, the output signals from the ECU 450 are shown to include an air supply command 424, a fuel supply command 434, a fuel injection command 452 and a heating power command 444.

As may be appreciated, signals from the engine are sent to the engine controller, which then uses these signals to perform several functions related to the injection of vaporized fuel including determining the type of fuel (liquid or vapor) that should be delivered to the engine for minimal emissions, injecting the appropriate amount of fuel in order to start and warm-up the engine and minimize emissions, controlling the power supplied to the capillary flow passages to achieve a target resistance, which translates into a desired target temperature and phasing over to liquid fuel injection.

Figure 10:
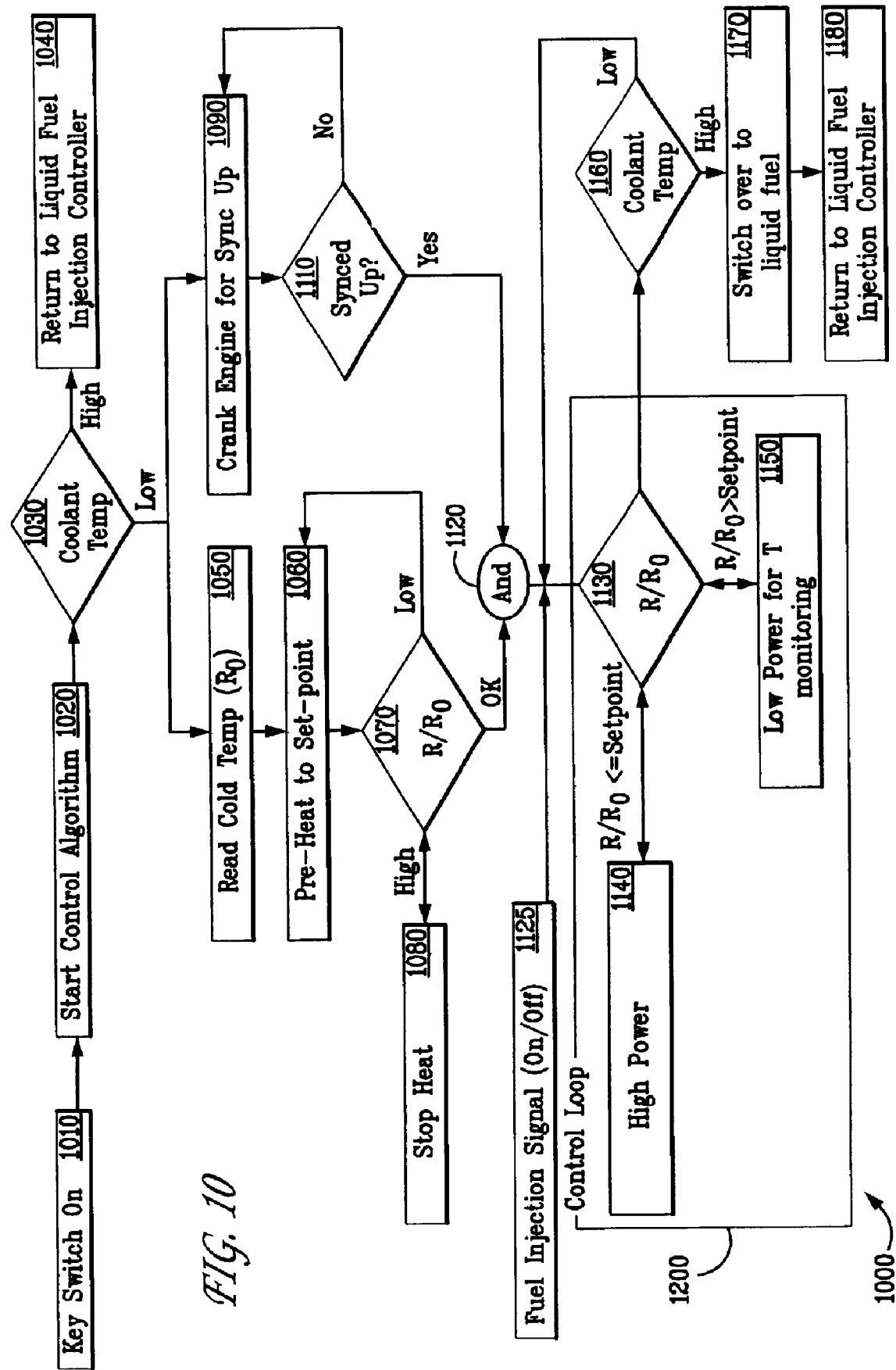
FIG. 10 is a vapor/liquid fuel injector control algorithm in which power to the injector is controlled via a binary (high/low) power source.

An example of a preferred control algorithm is shown schematically in FIG. 10. The fuel injector control algorithm 1000 of FIG. 10 controls power to the injector via a binary (high/low) power source. The control algorithm 1000 is initiated by placing the automobile's key switch in the "on" position 1010. In the determination of the type of fuel (liquid or vapor) to be delivered to the engine, signal 1030, which may be coolant temperature or other signal representative of degree of engine warm-up (e.g., lubricant temperature, intake manifold air temperature or time elapsed from engine start-up) is compared to a set-point. If the coolant or lubricant or intake manifold air temperature, as the case may be, is greater than or equal to the set-point, the engine controller will specify liquid fuel delivery to the engine 1040. Likewise, if the engine is running and the time elapsed from engine start-up is greater than or equal to a set-point (e.g. 5 minutes), the engine controller will specify liquid fuel delivery to the engine 1040.

Alternatively, if the signal representative of degree of engine warm-up, such as coolant temperature, is below the set-point, the ECU will pre-heat the capillary flow passage 1060 and, optionally, synchronize the engine 1090 for open valve injection through increased cranking time. In the embodiment of FIG. 10, the capillary flow passage preheat temperature is achieved through a basic on/off control loop in which heat is supplied to the capillary until the target temperature 1070 (resistance) is measured. When the temperature reaches the target value 1070, and the engine is still cranking, the heat to the capillary flow passage is removed (1080) for a short period of time to allow the temperature to drop slightly. After this short "off" period, power is again supplied to the capillary flow passage in order to measure the temperature. At this point the control loop is continued.

Once the capillary target temperature 1070 is reached and, optionally, the engine is synchronized for open valve injection 1090, the injector is set to receive the fuel injection command from the ECU. Given the relatively low thermal mass associated with the heated capillary delivery method, this warm-up process is expected to take significantly less than 0.5 seconds and, more preferably on the order of 0.1 seconds. Thus, the rate-limiting step in this phase of injector operation will be the synchronization of the engine 1090, if such a process is included in the engine start-up strategy.

In the injection of the appropriate amount of fuel for cold-start and warm-up of the engine, the amount of liquid fuel that is introduced into the engine during cold-start and warm-up is determined in accordance with the means, represented schematically in FIG. 9. Referring again to FIG. 9, as may be appreciated, this phase of fuel injection may be governed by an open-loop control algorithm in which the amount of fuel injected is determined through look-up maps based on factors such as engine speed 460 and accelerator position 520. Alternatively, fuel injection may be governed by a feedback control loop in which the exhaust air/fuel ratio signal 550 is used to determine the injected amount of fuel or a predictive control algorithm governed by the throttle position 520. In still another embodiment, the throttle position signal 520 is passed to the ECU 450 and a predictive control strategy is used to determine the quantity of fuel required for the given engine conditions.

Referring again to FIG. 10, to ensure that high quality vapor is injected into the engine throughout the cold-start and warm-up period, a technique is provided for controlling the power to the capillary flow passage to maintain a target resistance (i.e., temperature), as the fuel delivery is pulsed and/or the engine fueling requirements change. This is depicted in the "Control Loop" 1200 in FIG. 10. As shown in FIG. 10, the resistance of the capillary flow passage is used as a feedback to determine the appropriate adjustment in power to the capillary flow passage to maintain the target ratio of measured resistance to cold capillary flow passage resistance (R/Ro) 1130.

The embodiment shown in FIG. 10 depicts a step-wise or digital control algorithm where high power 1140 is supplied to heat the capillary if R/Ro 1130 is less than or equal to the set point. Conversely, low power 1150 is supplied to the capillary flow passage when R/Ro 1130 is greater than the set-point. Under such low power conditions the device undergoes convective cooling while resistance is measured and passed back to the controller.

As implied above, the use of an appropriate resistance set-point is critical to the performance of the capillary flow passage-based fuel injector. That is, a low set-point will result in a lack of heat delivered to the fuel which, in turn, will result in poor quality vapor delivered to the engine. Conversely, a high set-point will result in a local hot spot near the end of the capillary such that the temperature of the rest of the capillary is significantly lower than the mean temperature as represented by the resistance of the capillary. Consequently, such a condition results in poor vapor quality as well.

Based on these observations, it has been empirically determined that the preferred resistance set-point for a given capillary generally corresponds to the point at which the ratio of power to mass flow through the capillary is maximized. It is important to note that a preferred resistance set-point for a given capillary flow passage is largely insensitive to fuel pressure.

As indicated in FIG. 10, in parallel to the control of R/Ro 1130, the coolant temperature 1160 is continually compared to the set-point, which signifies fully warm engine conditions. If the coolant temperature is below the respective set-point, heat continues to be supplied to the capillary flow passage via the capillary flow passage control loop 1200 and, thus, high quality fuel vapor continues to be delivered to the engine. Conversely, if the coolant temperature 1160 is above the set-point for warm engine operation, the control algorithm begins the phase over to liquid fuel.

Referring again to FIG. 9, the process of switching over from vaporized to liquid fuel can take any of several forms and will be a function of the particular capillary flow passage injector configuration employed. In one approach to switching over to liquid fuel, the coolant temperature signal 464 is used to actuate a switching valve 610 and 620 and optionally disable power to the capillary flow passage, which directs the fuel supply away from the capillary flow passage 480 and toward a conventional liquid fuel injection flow passage 660. In practice, this approach will require the fuel injector configuration shown schematically in FIG. 6.

While the subject invention has been illustrated and described in detail in the drawings and foregoing description, the disclosed embodiments are illustrative and not restrictive in character. All changes and modifications that come within the scope of the invention are desired to be protected. As an example, a plurality of capillary passages can be provided, with the fuel being passed through the passages in parallel when a higher volume flow rate is desired.

What is claimed is:

1. A method for controlling a fuel system and delivering fuel to an internal combustion engine, the fuel system including at least one fuel injector having at least one capillary flow passage, a heat source arranged along the at least one capillary flow passage, the heat source capable of heating the liquid fuel in the at least one capillary flow passage to a level sufficient to convert at least a portion thereof from the liquid state to a vapor state and at least one intake valve for selectively opening and closing a passageway from said at least one fuel injector to a combustion chamber within said internal combustion engine, the method comprising the steps of:

(a) measuring a value indicative of degree of engine warm-up;

(b) controlling power supplied to the heat source of the at least one fuel injector to achieve a predetermined target temperature, the predetermined target temperature operable to convert the portion of liquid fuel to the vapor state; and (c) simultaneously with step (b), injecting an initial fuel pulse from said at least one fuel injector while said at least one intake valve is in a substantially closed position.

2. The method of claim 1 wherein the said at least one intake valve is in a completely closed position at the time said initial fuel pulse is injected.

3. The method of claim 1 further comprising the step of returning to normal fuel injection timing after said initial fuel pulse and upon obtaining said predetermined temperature for said heat source.

4. The method of claim 1 wherein said initial fuel pulse is injected against the backside of said at least one intake valve.

5. The method of claim 1 wherein said fuel system comprises a plurality of fuel injectors each having at least one capillary flow passage.

6. The method of claim 1 wherein said fuel system further comprises at least one fuel injector not having at least one capillary flow passage.

7. A method for controlling a fuel system and delivering fuel to an internal combustion engine, the fuel system including at least one fuel injector having at least one capillary flow passage, a heat source arranged along the at least one capillary flow passage, the heat source capable of heating the liquid fuel in the at least one capillary flow passage to a level sufficient to convert at least a portion thereof from the liquid state to a vapor state and at least one intake valve for selectively opening and closing a passageway from said at least one fuel injector to a combustion chamber within said internal combustion engine, the method comprising the steps of:

(a) determining engine air flow;

(b) measuring a value indicative of degree of engine warm-up;

(c) determining a portion of liquid fuel to be converted to the vapor state by the at least one capillary flow passage, said determining step employing the values measured in steps (a)–(b);

(d) controlling power supplied to the heat source of the at least one fuel injector to achieve a predetermined target temperature, the predetermined target temperature operable to convert the portion of liquid fuel to the vapor state determined in step (c);

(e) simultaneously with step (d), injecting an initial fuel pulse from said at least one fuel injector while said at least one intake valve is in a substantially closed position.

(f) upon said heat source achieving said predetermined target temperature, delivering the fuel to a combustion chamber of the internal combustion engine;

wherein the portion of liquid fuel to be converted to the vapor state is determined to achieve minimal exhaust emissions.

8. The method of claim 7, wherein said step of determining engine air flow further comprises (i) measuring engine speed and (ii) measuring intake manifold pressure of the internal combustion engine.

9. The method of claim 7, wherein said step of controlling power supplied to the heat source of the at least one fuel injector includes the step of setting a resistance value, the resistance value relatable to the predetermined target temperature.

10. The method of claim 9, wherein said step of controlling power supplied to the heat source of the at least one fuel injector employs a binary power source.

11. The method of claim 7, wherein the delivery of vaporized fuel to the combustion chamber of the internal combustion engine is limited to a start-up and warm-up period of operation of the internal combustion engine.

12. The method of claim 9, further comprising delivering liquid fuel to the combustion chamber of the internal combustion engine when the internal combustion engine is at a fully warmed condition.

13. A fuel system for use in an internal combustion engine, comprising:

(a) a plurality of fuel injectors, each injector including (i) at least one capillary flow passage said at least one capillary flow passage having an inlet end and an outlet end; (ii) a heat source arranged along the at least one capillary flow passage, said heat source operable to heat the liquid fuel in said at least one capillary flow passage to a level sufficient to convert at least a portion thereof from the liquid state to a vapor state, and (iii) a valve for metering fuel to the internal combustion engine, the valve located proximate to said outlet end of said at least one capillary flow passage;

(b) a controller to control the power supplied to said heat source of each of said plurality of fuel injectors to achieve a predetermined target temperature, the predetermined target temperature operable to convert the portion of liquid fuel to the vapor state;

(c) said controller being operable to inject an initial fuel pulse from said at least one fuel injector while said intake valve is in a substantially closed position prior to the said predetermined target temperature being reached.

14. The fuel system of claim 13 wherein the said intake valve is in a completely closed position at the time said initial fuel pulse is injected.

15. The fuel system of claim 13 wherein said controller is operable to return to normal fuel injection timing after said initial fuel pulse and upon obtaining said predetermined temperature for said heat source.

16. The fuel system of claim 13 wherein said initial fuel pulse is injected against the backside of said at least one intake valve.

* * * * *